(12) United States Patent
Malacarne et al.

(10) Patent No.: US 7,432,809 B2
(45) Date of Patent: Oct. 7, 2008

(54) SYSTEM AND METHOD FOR IMPROVING THE DETECTION EFFICIENCY OF AN IDENTIFICATION SYSTEM INCLUDING A TRANSPONDER AND A READER

(75) Inventors: Enrico Malacarne, Duebendorf (CH); Carlo Mutti, Origlio (CH); Mauro Di Domenico, Bironico (CH); Hassan-Zade Parvis, Morcote (CH)

(73) Assignee: Datamars S.A. (CH)

( * ) Notice: Subject to any disclaimer, the term of this patent is extended or adjusted under 35 U.S.C. 154(b) by 161 days.

(21) Appl. No.: 11/235,767

(22) Filed: Sep. 27, 2005

(65) Prior Publication Data
US 2007/0046429 A1 Mar. 1, 2007

(30) Foreign Application Priority Data
Aug. 29, 2005 (EP) ................... 05018727

(51) Int. Cl.
*G08B 13/14* (2006.01)
(52) U.S. Cl. ................ 340/572.1; 340/10.1; 340/10.34; 340/5.62
(58) Field of Classification Search ... 340/572.1–572.9, 340/10.1, 10.3, 10.34, 573.2, 573.3, 551–552, 340/686.6; 342/51; 235/435–436, 449, 451
See application file for complete search history.

(56) References Cited
U.S. PATENT DOCUMENTS
3,696,379 A 10/1972 Minasy
5,352,877 A 10/1994 Morley
6,476,708 B1* 11/2002 Johnson .................... 340/10.34
6,621,417 B2* 9/2003 Duncan et al. ........... 340/572.1
7,245,222 B2* 7/2007 Bierach .................... 340/572.4
2004/0100358 A1* 5/2004 Waters et al. ................ 340/5.1
2004/0256460 A1 12/2004 Charrat FOREIGN PATENT DOCUMENTS
EP 0 944 014 A2 9/1999
GB 844 065 A 8/1960
GB 1 406 500 A 9/1975

* cited by examiner

*Primary Examiner*—George A Bugg
*Assistant Examiner*—Hoi C Lau
(74) *Attorney, Agent, or Firm*—Akerman Senterfitt

(57) ABSTRACT

The invention relates to a radio frequency (RF) system and method for improving the detection efficiency of an identification system including a transponder and a reader.

The system (1) comprises an interrogator reader device (3) having an interrogator coil antenna (4) and a transponder (2) having a transponder coil antenna (5) and a microchip (6) Advantageously, the interrogator reader device (3) comprises a detection portion (11) including a sensitive signal gain detector (SSGN) for detecting just the presence of the transponder coil antenna (5) in case of misplacement of the transponder or broken link between the transponder coil antenna (5) and the microchip (6).

The invention allows remedying to those potentially dangerous situations that might lead to a misdetection of the transponder (2).

10 Claims, 2 Drawing Sheets

SYSTEM AND METHOD FOR IMPROVING THE DETECTION EFFICIENCY OF AN IDENTIFICATION SYSTEM INCLUDING A TRANSPONDER AND A READER

BACKGROUND OF THE INVENTION

In its more general aspect the present invention relates to a system and method for improving the detection efficiency of an identification system including a transponder and a reader.

More specifically, the invention relates to a radio frequency (RF) identification system comprising an interrogator reader device having an interrogator coil antenna and a transponder having a transponder coil antenna and a microchip.

As is well know in this specific technical field, transponders are electronic circuits or microchips associated to a coil antenna and including a memory portion containing information for the identification of any type of object, for instance for identification of animals or for attaching dedicated information to any type of item in logistics processes, etc.

Transponders are normally used in combination with a reader device, which exchange signals with the transponder and recovers the information stored inside allowing such information to be available to a user.

In some occasions the reader device is used for sending also information to the transponder, so that new data or updated information may also be stored in the transponder memory portion.

It's worthwhile noting that transponders have little energy at their disposal for internal handling of the stored information, for instance for the reading and writing operations and for transmitting the required information to the interrogating reader device.

In this respect we may consider that there are substantially two kind of transponders: the so-called active transponders, including an internal energy source, such as a small battery, and the so-called passive transponders that have no internal energy source but make use the energy of the electromagnetic field provided by the interrogating reader device.

The present invention is focused on passive transponders; however, the principle of the invention may also be applied to active transponders.

PRIOR ART

As already mentioned, one of the possible applications of the transponders is for the identification of animals, for instance pet animals carrying information concerning their pedigree, the owner's data or an unique number which could be used to identify the animal.

A passive transponder storing the relevant information of the pet animal may be implanted together with a proper transponder support under the animal's skin and may even remain implanted for the animal's all life long.

However, it might happen that the physical position of the transponder changes with time under the animal's skin or could not be detected in positions where the transponder normally and traditionally should be. This happens particularly to big pet animals performing a strong muscular activity, such as for instance big dogs. Moreover, the physical position of the transponder could be based or decided according to different rules in different Countries.

In case of a possible escape of the animal a misplaced transponder may raise serious problems during a subsequent detecting phase performed for instance by and a dogcatcher provided with an interrogating reader device.

As a matter of fact such a detecting phase is normally performed passing the reader around the traditional locations (neck, shoulders) wherein the transponders are implanted. However, if the transponder is misplaced and the detecting phase is not performed with the due care it might happen that the reader does not detect an answer from the transponder with the result that the animal is not identified and may be routed to be killed.

This situation is complicated by the fact that the interrogating reader devices actually on the market work according to a predetermined number of different protocols and emit detection signals according to these protocols, each emitted within a predetermined time window.

A diagram shown in FIG. 1 reports a possible sequence of radio detection patterns A, B, C and D that are cyclically repeated by the interrogating reader device, each pattern in a corresponding time window.

More specifically, the reader is looking cyclically for all different type of transponders; for instance some transponder systems use a modulation scheme known as Amplitude Modulation-Phase Shift Keying (AM-PSK) or Frequency Shift Keying (FSK). However, there are other modulation schemes on the market; but scanning for all the most known types of transponders needs a certain time window.

In some occasions such a time window combined with the moving speed of the reader prevents the reader to see the transponder with its appropriate information.

For instance, if the animal carries a transponder that is sensible to the C pattern and the reader passing over the hidden transponder is emitting another pattern in that specific time instant of the detection phase, the detection fails.

This happens also if, for any reason, there is an interruption in the interconnection between the coil antenna and the corresponding microchip in the transponder.

Generally, this situation could happen even in other field of application of the RF identification systems. For instance, tag detectors used for laundry applications could suffer for extreme process treatments (washing, steam heating, et al.) and in some occasion could present a malfunction state.

Moreover, the above drawbacks are amplified by the fact that the efficiency of the detection phase depends on the distance between the interrogating reader device and the transponder.

Up to now no identification system realized according to the prior art is capable to provide an efficient detection of a hidden or broken transponder as reported in previous lines.

In view of the foregoing, the main aim of the present invention is that of providing a method and a system for improving the detection efficiency of an identification system including a transponder and a reader and for reducing the possibility of mistakes or misdetections in case the transponder is misplaced inside the animal or the item to be detected.

Another aim of the present invention is that of obtaining better performances and an improved efficiency of the identification system with only a minor modification of the reader structure obtained at low cost.

A further aim of the invention is that or reducing to the minimum the probability of a misdetection and the risk of a missing identification of an item carrying a hidden or broken transponder.

SUMMARY OF THE INVENTION

The solution idea that is behind this invention is that of detecting just the presence of the coil antenna of the hidden or broken transponder, no matter if the information content of the transponder may not be identified.

In other words, the tag detector of the present invention is structured for further detecting the presence of a tag based on the distortion of the magnetic field and not just for looking for the information on the tag.

According to a first aspect of the invention this aim is attained by a radio frequency (RF) identification system of the type previously indicated and characterized in that said interrogator reader device comprises a detection portion including a sensitive signal gain detector SSGN for detecting just the presence of said transponder coil antenna in case of misplacement of the transponder or broken link between said transponder coil antenna and said microchip.

The invention further relates to a method for improving the detection efficiency of a radio frequency identification system comprising an interrogator reader device having an interrogator coil antenna and a transponder having a transponder coil antenna and a microchip. The method includes the steps of supplying one terminal of the interrogator coil antenna with a periodic voltage value, thus obtaining a resonant primary coil; checking the possible presence of the transponder bringing the inductive load represented by the transponder coil antenna into the magnetic field of the primary coil; detecting just presence of the transponder coil antenna through a detection portion connected to the opposite terminal of the interrogator coil antenna and including a sensitive signal gain detector; and emitting a warning signal in case of misplacement of the transponder or broken link between the transponder coil antenna and the microchip.

The features and advantages of the system and method according to the present invention will be apparent from the following detailed description of the embodiment thereof, given as non-limiting examples with reference to the accompanying drawings.

DETAILED DESCRIPTION

Figure 1:
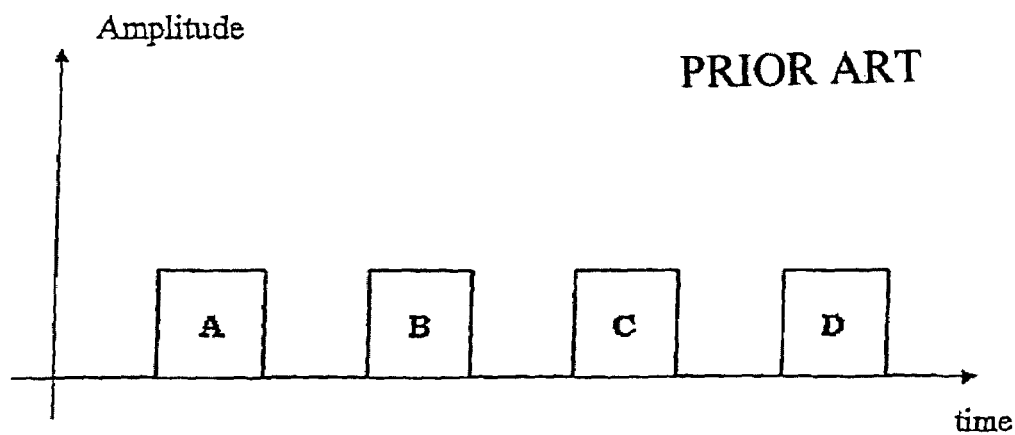
FIG. 1 shows a sequence of different signal patterns emitted by known interrogation reader devices for transponder systems.
Figure 2:
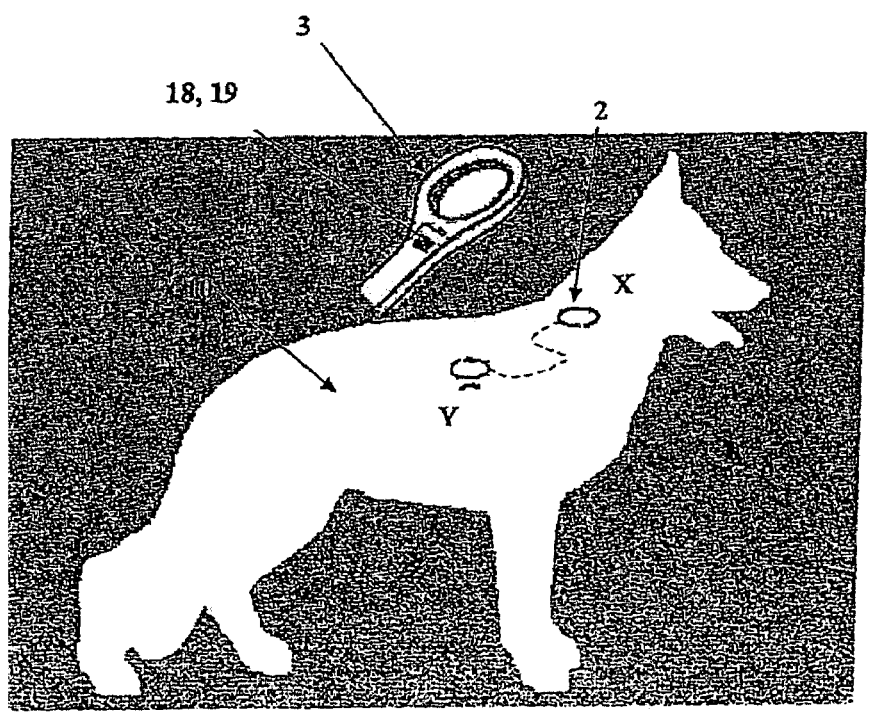
FIG. 2 shows schematically an animal carrying a transponder that moved from its original implantation site.
Figure 3:
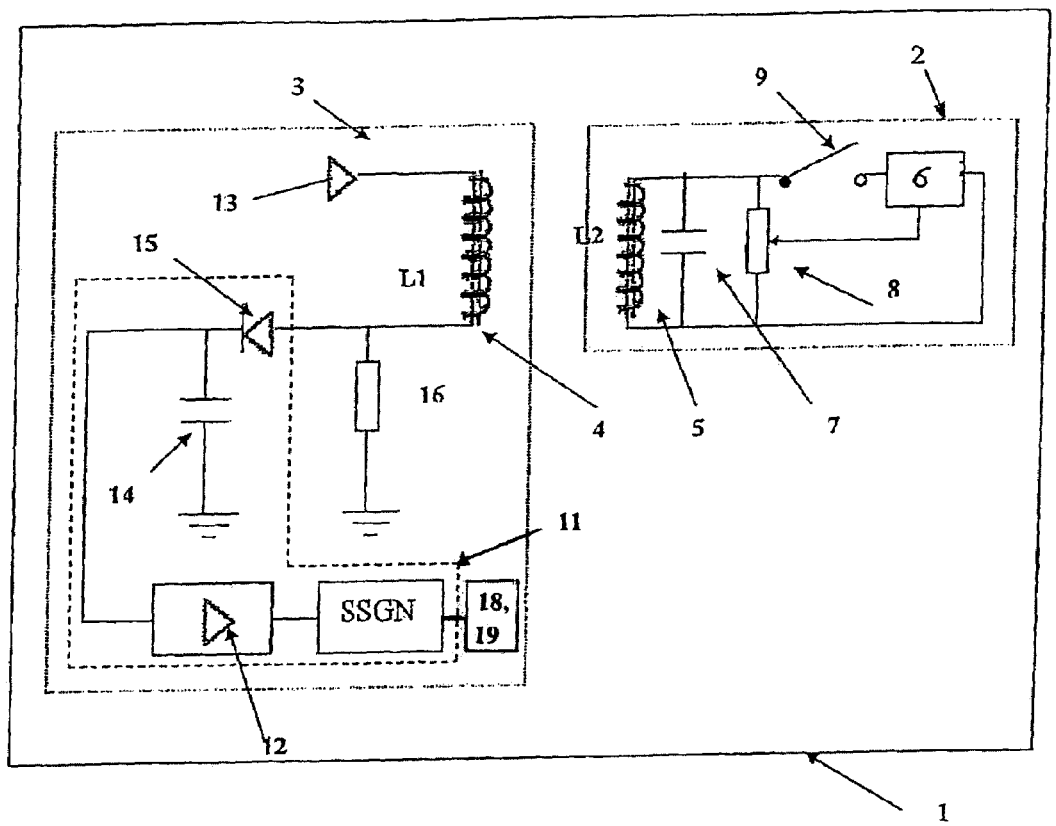
FIG. 3 shows schematically an identification system including a transponder and a reader.

With reference to the enclosed drawings, and more specifically to the examples in FIGS. 2 and 3, with 1 is globally and schematically indicated an identification system according to the present invention and including a transponder 2 and an interrogating reader device 3.

Advantageously, the identification system 1 of the present invention has improved detection performances since it operates according to the method disclosed hereinafter.

In the following specification and claims, "transponder" means any responding device, which may be activated for transmitting information to an interrogating reader device.

Moreover, the energy source for the transponder 2, for instance a battery in the case of active transponders or the energizing field of the reading device 3 in the case of passive transponders, is not relevant for the purpose of the invention.

The transponder 2 may be conventionally implanted under the skin of a big pet animal, for instance a big dog 10 shown schematically in FIG. 2.

Obviously, the principle of the invention may be applied to any other possible field of application of transponders like that concerning the association of dedicated information to items of industrial environment or production or in logistics processes. The invention is particularly appropriate in all situations wherein the transponder is hidden inside the item or is misplaced with respect to an original installation position.

The transponder 2 may be any conventional RF transponder, for instance a transponder including a glass or plastic capsule protecting a coil antenna 5 and a microchip 6, which contains a unique identification code.

More specifically, the transponder 2 may be structured as disclosed in the European patent application No. 1 291 818 or in the other European patent application No. 1 308 872 both in the name of the same applicant.

The coil antenna 5 may be connected in parallel to a capacitor 7 and to a variable resistance 8, as shown in FIG. 3. The value of the variable resistance is regulated by the microchip 6 so that the coil antenna 5 may be tuned to a predetermined interrogation frequency.

As a matter of fact, the coil antenna 5 has a natural frequency, which is preferably tuned to the interrogation frequency of the reader device 3.

Optionally, the transponder may include an auxiliary antenna for enhancing the performances of the identification system.

An auxiliary antenna is not strictly required for implementing the present invention; however, an auxiliary antenna may be placed between the interrogating reader device 3 and the transponder 2, preferably in proximity of the transponder antenna 5 and tuned to the interrogating frequency of the reader 3.

The auxiliary antenna is coupled with the transponder antenna 5 and the inductive interrogator antenna 4 to focus the electromagnetic field and/or to match particular characteristics of the identification system, such as the impedances of the transponder antenna 5 and/or of the interrogator antenna 4, resulting in an enhanced performance. For instance the auxiliary antenna may be configured and dimensioned for changing at least one characteristic of at least one of the interrogator antenna 4 and the transponder antenna 5, e.g. the respective resonance frequencies.

FIG. 3 shows schematically the parts of the identifying system 1 of the invention comprising the interrogator reader device 3 having an inductive interrogator antenna 4 and the transponder 2 including the transponder coil antenna 5.

The interrogating reader device 3 and the transponder 2 are inductively coupled for exchanging communication signals when the reader device 3 is placed in the proximity of the transponder 2.

However, as reported in the preamble of the present disclosure, the transponder 2 may be displaced from its original position X to a final position Y, as shown in FIG. 2, or the interconnection between the coil antenna 5 and the microchip 6 may be broken as shown schematically by the open switch 9 in FIG. 3.

The invention allows remedying to those potentially dangerous situations that might lead to a misdetection of the transponder 2.

According to the invention the interrogating reader device 3 is provided with a detection portion 11 including a sensitive signal gain detector shown as SSGN. This detectors may be a special detection circuit similar to those used in metal detectors or an oscilloscope.

The interrogator antenna 4 has one terminal that is supplied with an impulsive voltage value, for instance a periodic supply voltage, through a conventional amplifier 13 thus obtaining a resonant primary coil L1. The opposite terminal of the interrogator antenna 4 is coupled to a potential reference, for instance a voltage potential reference (GND), through a resistance 16.

This primary coil L1 resonates at a frequency that is determined by the values of the individual component of the interrogating reader device 3.

Now, the inductive load represented by the coil antenna 5 of the transponder 2 is a secondary coil L2 that is inductively coupled to the primary coil L1, no matter if the connection with the microchip 6 is broken or if the power transfer is small due to the distance between the primary and the secondary.

As the secondary coil L2 is brought into the magnetic field of the primary coil L1 the power transfer efficiency drops off or decreases because of the de-tuning effect caused by the inductive load L2.

This reduction in the power transfer efficiency is detected by the detection portion 11 of the interrogating reader device 3.

To this purpose the opposite terminal of the interrogator antenna 4 is connected to a gain stage 12 through a diode 15.

A de-coupling capacitance 14 is connected between the diode 15 and the voltage reference GND.

The output of the gain stage 12 is connected to the sensitive signal gain detector SSGN that may be a simple oscilloscope providing an output signal 20 that is indicative of the presence of a secondary coil L2 of the transponder 2. This output signal is processed to provide a warning signal Due to the very limited energy received back by the interrogating reader 3 from the passive transponder 2, as a consequence of the air gap and distance between the interrogating reader device 3 and the hidden transponder or because of the fault situation of the transponder itself, the reception of the information is disturbed and the reader is unable to properly assess this information.

However, according to the invention, even if the energy level of the signal received back by the interrogating reader device 3 from the transponder 2 is rather low, reception of a signal detected by the oscilloscope is enough for indicating the possible presence of a transponder and suggestion a deeper investigation.

Figure 4:
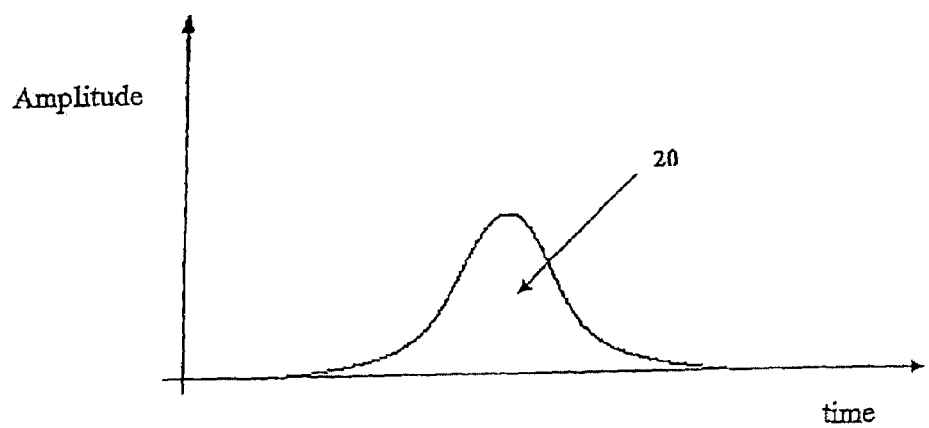
FIG. 4 shows a diagram reporting the possible pattern response of broken or misplaced implanted tag when detected by the interrogation reader device of the present invention.

In FIG. 4 is reported the possible shape of the pattern 20 obtained by the low energy level of the detected signal. In this manner, the tag detector 1 of the present invention is able to detect the presence even of a possible broken tag basing the detection just on the distortion of the magnetic field and not on the information content of the tag.

Optionally, the interrogating reader device 3 may be properly provided with a specific light emission device 18 and/or with a sound emitter 19 directly driven by the warning signal obtained from the output of the sensitive signal gain detector SSGN.

The light and/or sound provided by those flags 18, 19 are suitably distinguished by the lights and sounds that the interrogating reader device 3 normally emits to indicate the presence of a recognized transponder 2 and the load of the information stored therein.

In another possible embodiment of the present invention, the interrogating reader device 3 comprises more than one receiving unit, each comprising a respective coil antenna. The coil antennas of the receiving units are located in different points of the reader 3 so that a possible easier detection is provided.

As may be appreciated by the foregoing description, the identification system of the present invention allows to solve the serious problem of detecting the simple presence of a transponder coil in hard working conditions wherein a misplacement of the hidden transponder or possible fault situation may bring to possible misdetections.

This is obtained with a minor and low cost modification in the structure of the interrogating reader device.

The principle of the invention may be even applied to other application fields using tag detectors; for instance in laundry applications.

In fact the RFID associated to clothes that are frequently treated in industrial laundries may be subject to damages due to the severe washing and heating process conditions. It might happen that a tag detector remains damaged by such a treatment and its response could be wrong or even missing.

In such a case the identification system 1 of the present invention, including the modified interrogating reader device 3, would be able to detect just the presence of a transponder coil antenna even in case of broken link between the transponder coil antenna and the microchip of the transponder.

Thus, the flag signal obtained by the identification system 1 would be used as a warning that the broken RFID of that specific item of clothing should be replaced.

The invention claimed is:

1. A radio frequency identification system comprising:
  an interrogating reader device having an interrogator coil antenna; and
  a transponder having a transponder coil antenna and a microchip,
  wherein said interrogator reader device comprises a detection portion including a sensitive signal gain detector for detecting just the presence of said transponder coil antenna in case of misplacement of the transponder or broken link between said transponder coil antenna and said microchip, and
  wherein said sensitive signal gain detector emits an output signal indicative of a broken link between said transponder coil antenna and said microchip of said transponder.

2. A radio frequency identification system according to claim 1, wherein said sensitive signal gain detector is a special circuit for detection of metal or ferrite.

3. A radio frequency identification system according to claim 1, wherein said sensitive signal gain detector detects just a reduction in the power transfer efficiency due to the de-tuning effect caused by an inductive load of the coil antenna, not necessarily in resonance.

4. A radio frequency identification system according to claim 1, wherein one terminal of said interrogator antenna is connected to a gain stage of said detection portion through a diode.

5. A radio frequency identification system according to claim 4, wherein a de-coupling capacitance is connected between said diode and a voltage potential reference.

6. A radio frequency identification system according to claim 4, wherein the output of the gain stage is connected to said sensitive signal gain detector to provide an output signal that is indicative of the presence of a secondary coil of the transponder.

7. A radio frequency identification system according to claim 4, wherein said interrogator reader device is provided with at least one of a specific light emission device and a sound emitter directly driven by the output of said signal gain detector.

8. A radio frequency identification system according to claim 7, wherein at least one of light and sound provided by at least one of said light emission device and said sound emitter different from lights and/or sounds that said interrogating reader device normally emits to indicate the presence of a recognized transponder and the load of the information stored therein.

9. A method for improving the detection efficiency of a radio frequency identification system comprising an interrogator reader device having an interrogator coil antenna and a transponder having a transponder coil antenna and a microchip, the method comprising the steps of:

supplying one terminal of the interrogator coil antenna with a periodic voltage value, thus obtaining a resonant primary coil;

checking the possible presence of the transponder by bringing an inductive load presumed to be carrying a transponder and transponder coil antenna into the magnetic field of the primary coil;

detecting just the presence of the transponder coil antenna through a detection portion connected to the opposite terminal of said interrogator coil antenna and including a sensitive signal gain detector; and emitting a warning signal in case of misplacement of the transponder or broken link between the transponder coil antenna and the microchip.

10. A method according to claim 9, wherein the warning signal is used to drive a specific light emission device and/or a sound emitter in the interrogator reader device.

* * * * *